United States Patent
Pacala

(10) Patent No.: US 12,270,950 B2
(45) Date of Patent: Apr. 8, 2025

(54) LIDAR SYSTEM WITH FOG DETECTION AND ADAPTIVE RESPONSE

(71) Applicant: Ouster, Inc., San Francisco, CA (US)

(72) Inventor: Angus Pacala, San Francisco, CA (US)

(73) Assignee: Ouster, Inc., San Francisco, CA (US)

( * ) Notice: Subject to any disclaimer, the term of this patent is extended or adjusted under 35 U.S.C. 154(b) by 1031 days.

(21) Appl. No.: 17/229,691

(22) Filed: Apr. 13, 2021

(65) Prior Publication Data

US 2021/0333371 A1    Oct. 28, 2021

Related U.S. Application Data

(60) Provisional application No. 63/016,916, filed on Apr. 28, 2020.

(51) Int. Cl.
| | |
|---|---|
| *G01C 3/08* | (2006.01) |
| *G01S 7/481* | (2006.01) |
| *G01S 7/4861* | (2020.01) |
| *G01S 17/10* | (2020.01) |
| *G01S 17/931* | (2020.01) |

(52) U.S. Cl.
CPC .......... *G01S 7/4861* (2013.01); *G01S 7/4815* (2013.01); *G01S 7/4816* (2013.01); *G01S 7/4817* (2013.01); *G01S 17/10* (2013.01); *G01S 17/931* (2020.01)

(58) Field of Classification Search
CPC .... G01S 7/4861; G01S 7/4815; G01S 7/4816; G01S 17/10
See application file for complete search history.

(56) References Cited

U.S. PATENT DOCUMENTS

| 8,310,655 B2 | 11/2012 | Mimeault |
| 2018/0259645 A1 | 9/2018 | Shu et al. |
| 2019/0011556 A1 | 1/2019 | Pacala et al. |
| 2019/0094136 A1 | 3/2019 | Juette |
| 2019/0361099 A1* | 11/2019 | Satat ........................ G01S 7/487 |
| 2020/0064483 A1 | 2/2020 | Li et al. |
| 2020/0116558 A1 | 4/2020 | Pacala et al. |
| 2021/0033734 A1* | 2/2021 | Hiroi ........................ G01S 17/95 |

(Continued)

FOREIGN PATENT DOCUMENTS

| CA | 2000049 C | 8/1995 |
| DE | 10001015 C2 | 11/2002 |
| DE | 102015112103 A1 | 1/2017 |

(Continued)

OTHER PUBLICATIONS

International Search Report and the Written Opinion, Mailed On Aug. 12, 2021, in PCT Patent Application No. PCT/US2021/027974. 8 pages.

(Continued)

*Primary Examiner* — Mark Hellner
(74) *Attorney, Agent, or Firm* — Kilpatrick Townsend & Stockton LLP

(57) ABSTRACT

A LIDAR system can automatically determine, based on analysis of data collected from the sensor channels during operation, whether fog is present. If fog is present, the LIDAR system can operate in a fog mode, and if fog is not present, the LIDAR system can operate in a "clear-air" mode. The two modes can differ from each other with respect to the emitter signals and/or the signal processing applied to the sensor data.

20 Claims, 10 Drawing Sheets

(56) References Cited

U.S. PATENT DOCUMENTS

2021/0096262 A1* 4/2021 Vets ................. G01S 17/42
2021/0191399 A1* 6/2021 Verghese ............ G06V 10/89

FOREIGN PATENT DOCUMENTS

| DE | 102016014549 A1 | 7/2017 |
| DE | 102017221784 A1 | 6/2019 |
| EP | 3124996 A1 | 2/2017 |
| FR | 2969455 A1 | 12/2015 |
| JP | 2009192217 A | 8/2009 |
| JP | 2018096747 A | 6/2018 |
| WO | 2019139656 A1 | 10/2018 |
| WO | 2020018600 A1 | 1/2020 |
| WO | 2020025984 A1 | 2/2020 |

OTHER PUBLICATIONS

Application No. EP21795827.1, Extended European Search Report, Mailed On Sep. 16, 2024, 15 pages.
EP21795827.1, "Partial Supplementary European Search Report", Jun. 26, 2024, 16 pages.

\* cited by examiner

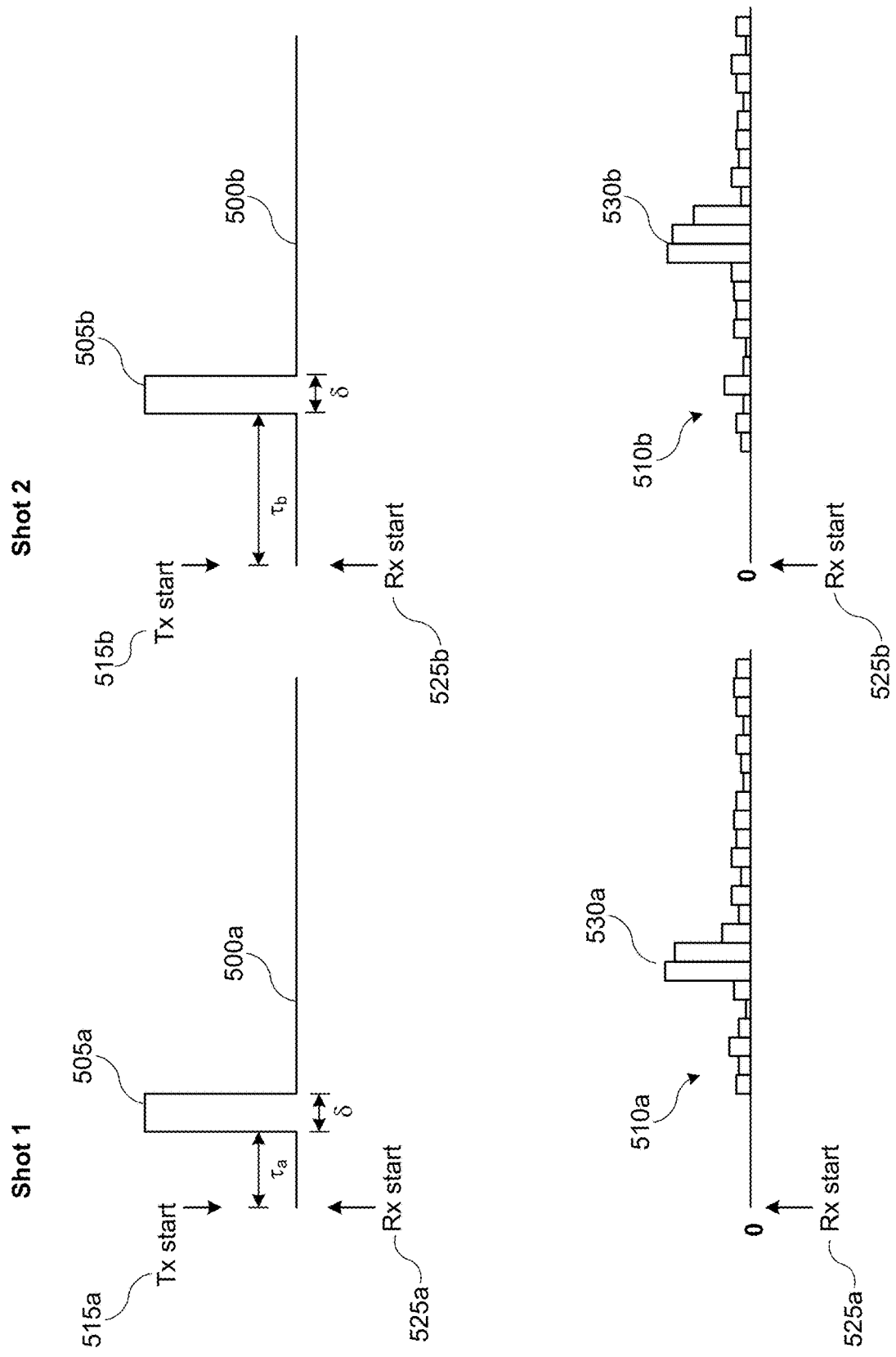

LIDAR SYSTEM WITH FOG DETECTION AND ADAPTIVE RESPONSE

CROSS-REFERENCES TO RELATED APPLICATIONS

This application claims the benefit of U.S. Provisional Application No. 63/016,916, filed Apr. 28, 2020, which is incorporated by reference herein.

This application is also related to U.S. patent application Ser. No. 15/909,628, filed Mar. 1, 2018, and published as U.S. Patent Application Pub. No. 2018/0259645 on Sep. 13, 2018, which is incorporated by reference herein.

BACKGROUND

This disclosure relates generally to LIDAR systems and in particular to LIDAR systems that can automatically detect fog and adapt operations in response to detecting fog.

Light imaging, detection and ranging (LIDAR) systems measure distance to a target by illuminating the target with a pulsed laser light and measuring the reflected pulses with a sensor. Time-of-flight measurements can then be used to make a digital 3D representation of the target. LIDAR systems can be used for a variety of applications where 3D depth images are useful including archaeology, geography, geology, forestry, mapping, construction, medical imaging, and military applications, among others. In some applications, for instance, autonomous vehicles can use LIDAR for obstacle detection and avoidance as well as vehicle navigation.

LIDAR systems generally operate using infrared wavelengths. Water droplets in the air can scatter or reflect the emitted light, which can complicate the task of extracting time-of-flight information from the sensor data. In particular, atmospheric fog can impair the accuracy of LIDAR measurements.

SUMMARY

Certain embodiments of the present invention relate to LIDAR systems and methods of operating LIDAR systems that provide improved performance in the presence of fog. For example, some LIDAR systems described herein can automatically determine, based on analysis of data collected from the sensor channels during operation, whether fog is present. If fog is present, the LIDAR system can operate in a fog mode, and if fog is not present, the LIDAR system can operate in a "clear-air" mode. The two modes can differ from each other with respect to the emitter signals and/or the signal processing applied to the sensor data. For example, Barker coding can be used in the fog mode and not used in the clear-air mode.

The following detailed description will provide a better understanding of the nature and advantages of the claimed invention.

BRIEF DESCRIPTION OF THE DRAWINGS

FIGS. 5A-5C show an example of Barker coding for a LIDAR system according to some embodiments.

TERMS

Figure 1B:
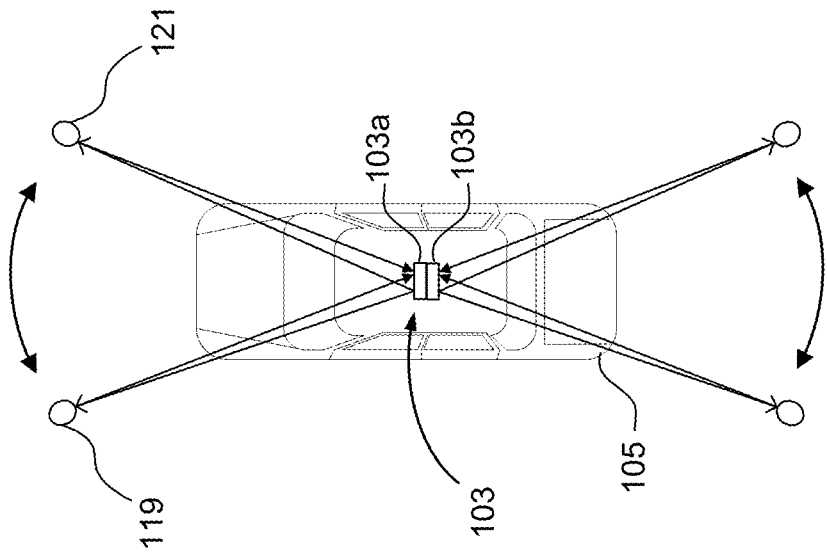
FIGS. 1A-1B show an automotive application for light ranging devices, also referred to herein as LIDAR systems, according to some embodiments.

The term "ranging," particularly when used in the context of methods and devices for measuring an environment or assisting with vehicle operations, may refer to determining a distance or a distance vector from one location or position to another location or position. "Light ranging" may refer to a type of ranging method that makes use of electromagnetic waves to perform ranging methods or functions. Accordingly, a "light ranging device" may refer to a device for performing light ranging methods or functions. "Lidar" or "LIDAR" may refer to a type of light ranging method that measures a distance to a target by illuminating the target with a pulsed laser light, and thereafter measure the reflected pulses with a sensor. Accordingly, a "lidar device" or "lidar system" may refer to a type of light ranging device for performing lidar methods or functions. A "light ranging system" may refer to a system comprising at least one light ranging device, e.g., a lidar device. The system may further comprise one or more other devices or components, in various arrangements.

A "pulse train" may refer to one or more pulses that are transmitted together. The emission and detection of a pulse train may be referred to as a "shot." A shot can occur over a "detection time interval" (or "detection interval").

A "measurement" may include N multiple pulse trains that are emitted and detected over N shots, each lasting a detection time interval. An entire measurement can be over a measurement time interval (or just "measurement interval"), which may equal the N detection interval of a measurement or be longer, e.g., when pauses occur between detection intervals.

A "photosensor" can convert light into an electrical signal. A photosensor may include a plurality of "photodetector," e.g., single-photon avalanche diodes (SPADs). A photosensor can correspond to a particular pixel of resolution in a ranging measurement.

A "histogram" may refer to any data structure representing a series of values over time, as discretized over time bins. A histogram can have a value assigned to each time bin. In examples below, the values can represent light intensity at a particular time corresponding to the time bin. For example, a histogram can store a count of a number of photodetectors that fired during a particular time bin in each of one or more detection intervals. As another example, a histogram can correspond to the digitization of an analog sensor signal indicative of light intensity at different times. Thus, a histogram can be considered as a photon time series or photon flux. A photodetector can be in "active operation" when it is producing signals and the signals are used in generating a histogram. A histogram can include contributions from signal (e.g., light originating from emitter pulses) and noise. A "raw" histogram (or accumulated photon time series) can contain the signal and the noise as digitized in memory without filtering or other operations. A "filtered histogram" may refer to the output after the raw histogram is passed through a filter. A histogram may be generated for a single shot or accumulated over multiple shots.

An emitted signal/pulse may refer to the "nominal," "ideal," or "template" pulse or pulse train that is not distorted. A reflected signal/pulse may refer to the reflected laser pulse from an object and may be distorted. A digitized signal/pulse (or raw signal) may refer to the digitized result from the detection of one or more pulse trains of a detection interval (or shot) as stored in memory and thus may be equivalent to a portion of a histogram. A detected signal/pulse may refer to the location in memory that the signal was detected. A detected pulse train may refer to the actual pulse train found by a matched filter. An anticipated signal profile may refer to a shape of a digitized signal resulting from a particular emitted signal that has a particular distortion in the reflected signal.

DETAILED DESCRIPTION

1. LIDAR System Overview 1.1. Example Application

Figure 1A:
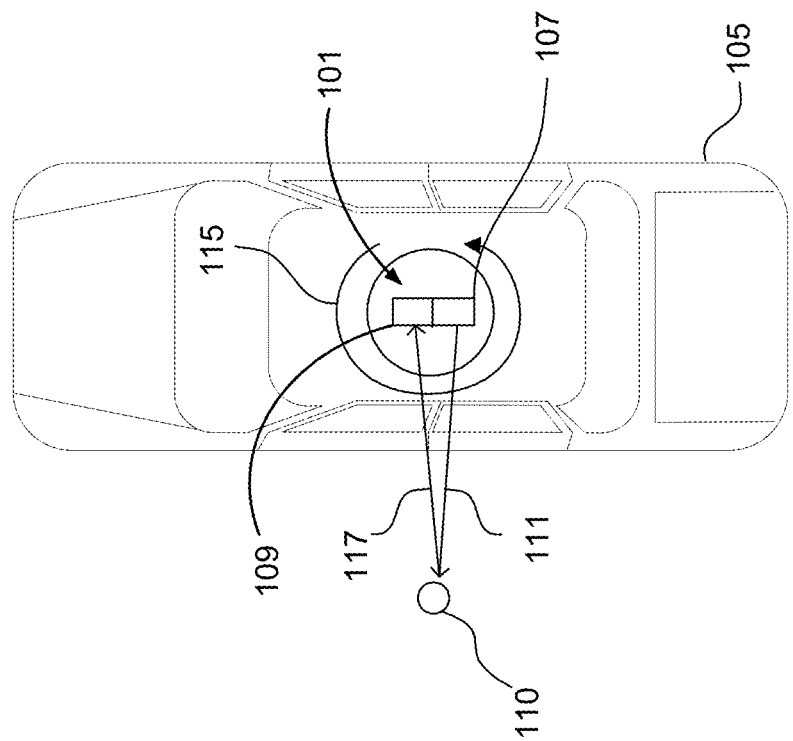

FIGS. 1A-1B show an automotive application for light ranging devices, also referred to herein as LIDAR systems, according to some embodiments. The automotive application for the LIDAR systems is chosen here merely for the sake of illustration, and the sensors described herein may be employed in other types of vehicles, e.g., boats, aircraft, trains, etc., as well as in a variety of other applications where 3D depth images are useful, such as medical imaging, mobile phones, augmented reality, geodesy, geomatics, archaeology, geography, geology, geomorphology, seismology, forestry, atmospheric physics, laser guidance, airborne laser swath mapping (ALSM), and laser altimetry. According to some embodiments, a LIDAR system, e.g., rotating LIDAR system 101 and/or static LIDAR system 103, can be mounted on the roof of a vehicle 105 as shown in FIGS. 1A and 1B.

The rotating (or scanning) LIDAR system 101 shown in FIG. 1A can employ a scanning architecture, where the orientation of the LIDAR light source 107 and/or detector circuitry 109 can be scanned around one or more fields of view 110 within an external field or scene that is external to the vehicle 105. In the case of the scanning architecture, the emitted light 111 can be scanned over the surrounding environment as shown. For example, the output beam(s) of one or more light sources (such as infrared or near-infrared pulsed IR lasers, not shown) located in the LIDAR system 101, can be scanned, e.g., rotated, to illuminate a scene around the vehicle. In some embodiments, the scanning, represented by rotation arrow 115, can be implemented by mechanical means, e.g., by mounting the light emitters and/or sensors to a rotating column or platform. In some embodiments, the scanning can be implemented through other mechanical means such as through the use of galvanometers. Chip-based steering techniques can also be employed, e.g., by using microchips that employ one or more MEMS based reflectors, e.g., such as a digital micromirror (DMD) device, a digital light processing (DLP) device, and the like. In some embodiments, scanning can be effectuated through non-mechanical means, e.g., by using electronic signals to steer one or more optical phased arrays.

For a stationary architecture, like static LIDAR system 103 shown in FIG. 1B, one or more solid state LIDAR subsystems (e.g., 103a and 103b) can be mounted to the vehicle 105. Each solid state LIDAR subsystem can face a different direction (possibly with partially overlapping and/or non-overlapping fields of view between units) so as to capture a composite field of view that is larger than each unit is capable of capturing on its own.

In either the scanning or stationary architectures, objects within the scene can reflect portions of the light pulses that are emitted from the LIDAR light sources. One or more reflected portions then travel back to the LIDAR system and can be detected by the detector circuitry. For example, reflected portion 117 can be detected by detector circuitry 109. The detector circuitry can be disposed in the same housing as the emitters. Aspects of the scanning system and stationary system are not mutually exclusive and thus can be used in combination. For example, the individual LIDAR subsystems 103a and 103b in FIG. 1B can employ steerable emitters such as an optical phased array or the composite unit may rotate through mechanical means thereby scanning the entire scene in front of the LIDAR system, e.g., from field of view 119 to field of view 121.

1.2. Example LIDAR System

Figure 2:
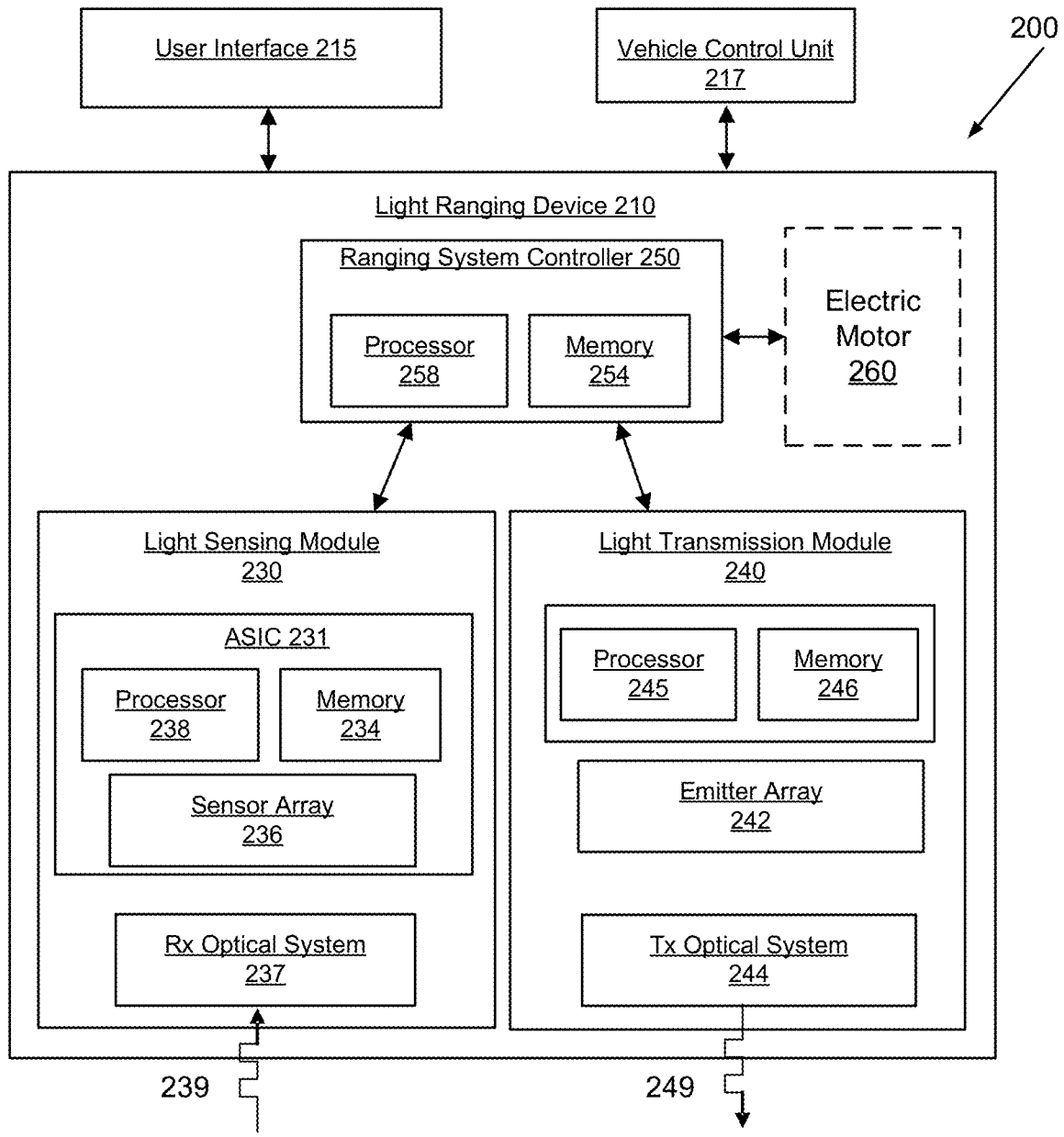
FIG. 2 shows a more detailed block diagram of a rotating LIDAR system according to some embodiments.

FIG. 2 shows a more detailed block diagram of a LIDAR system 200 according to some embodiments. LIDAR system 200 includes light ranging device 210. Light ranging device 210 includes a ranging system controller 250, a light transmission (Tx) module 240 and a light sensing (Rx) module 230. Ranging data can be generated by light ranging device 210 by transmitting one or more light pulses 249 from light transmission module 240 to objects in a field of view surrounding light ranging device 210. Reflected portions 239 of the transmitted light are then detected by light sensing module 230 after some delay time. Based on the delay time, the distance to the reflecting surface can be determined. Other ranging methods can be employed as well, e.g. continuous wave, Doppler, and the like.

Tx module 240 can include an emitter array 242, which can be a one-dimensional or two-dimensional array of emitters, and a Tx optical system 244, which when taken together can form an array of micro-optic emitter channels. Emitter array 242 or the individual emitters are examples of laser sources. Tx module 240 can also include a processor 245 and a memory 246. In some embodiments, a pulse coding technique can be used, e.g., Barker codes and the like. In such cases, memory 246 can store pulse-codes that indicate when light should be transmitted. For instance, pulse-codes can be stored as a sequence of integers stored in memory 246.

Rx module 230 can include a sensor array 236, which can be, e.g., a one-dimensional or two-dimensional array of photosensors. Each photosensor (also just called a sensor) can include a collection of photodetectors, e.g., SPADs or the like, or a sensor can be a single photon detector (e.g., an APD). Like Tx module 240, Rx module 230 includes an Rx optical system 237. Rx optical system 237 and sensor array 236 taken together can form an array of micro-optic receiver channels. Each micro-optic receiver channel measures light that corresponds to an image pixel in a distinct field of view of the surrounding volume. Each sensor of sensor array 236 can correspond to a particular emitter of emitter array 242, e.g., as a result of a geometrical configuration of light sensing module 230 and light transmission module 240.

In some embodiments, sensor array 236 of Rx module 230 is fabricated as part of a monolithic device on a single substrate (using, e.g., CMOS technology) that includes both an array of photon detectors and an ASIC 231 implementing a memory 234 (e.g., SRAM) and processor 238 for storage and signal-processing of the raw histograms from individual sensor channels in sensor array 236. As an example of signal processing, for each photon detector or grouping of photon detectors, memory 234 of ASIC 231 can accumulate counts of detected photons over successive time bins, and these time bins taken together can be used to recreate a histogram, or time series, of the reflected light pulse (i.e., a count of photons vs. time). ASIC 231 can implement matched filters and peak detection processing to identify time bins corresponding to return signals. In addition, processor 238 of ASIC 231 can implement various signal processing techniques, such as multi-profile matched filtering to help recover a photon time series that is less susceptible to pulse shape distortion that can occur due to photodetector saturation, quenching, or other effects. In some embodiments, all or parts of such signal processing can be performed by processor 258, which may be implemented as an FPGA.

In some embodiments, Rx optical system 237 can also be part of the same monolithic structure as ASIC 231, with separate substrate layers for each receiver channel layer. For example, an aperture layer, collimating lens layer, an optical filter layer and a photodetector layer can be stacked and bonded at the wafer level before dicing. The aperture layer can be formed by laying a non-transparent substrate on top of a transparent substrate or by coating a transparent substrate with an opaque film. In other embodiments, one or more components of Rx module 230 may be external to the monolithic structure. For example, the aperture layer may be implemented as a separate metal sheet with pin-holes.

In some embodiments, the photon time series (or histograms) output from ASIC 231 are sent to a ranging system controller 250 for further processing. For instance, the data can be encoded by one or more encoders of ranging system controller 250 and then sent as data packets to a user interface 215 and/or a vehicle control unit 217. Ranging system controller 250 can be implemented, e.g., using a programmable logic device such an FPGA, as an ASIC or as part of an ASIC, using a processor 258 with memory 254, or any combination of the above or other processing hardware. Ranging system controller 250 can control light sensing module 230 by sending (or relaying) commands that include start and stop light detection commands and commands to adjust photodetector parameters. Similarly, ranging system controller 250 can also control light transmission module 240 by sending (or relaying) commands that include start and stop light emission commands and commands to adjust light-emitter parameters (e.g., pulse codes, intensity, etc.). In some embodiments, ranging system controller 250 has one or more wired interfaces or connectors for exchanging data with light sensing module 230 and with the transmission module 240. In other embodiments, ranging system controller 250 communicates with light sensing module 230 and light transmission module 240 over a wireless interconnect such as an optical communication link.

Electric motor 260 can be provided when components of light ranging device 210, e.g., Tx module 240 and Rx module 230, are rotatable. System controller 250 can control electric motor 260 and can, for instance, start rotation, stop rotation and vary the rotation speed.

In some embodiments, LIDAR system 200 can interact with one or more instantiations of a user interface 215. Different instantiations of user interface 215 can vary and may include, e.g., a computer system with a monitor, keyboard, mouse, CPU and memory; a touch-screen in an automobile; a handheld device with a touch-screen; or any other appropriate user interface. User interface 215 may be local to the object upon which light ranging device 210 is mounted but can also be a remotely operated system. For example, commands and data to/from light ranging device 210 can be routed through a cellular network (LTE, etc.), a personal area network (Bluetooth, Zigbee, etc.), a local area network (Wi-Fi, IR, etc.), or a wide area network such as the Internet.

User interface 215 can include a combination of hardware and software components that can present LIDAR data (including, e.g., raw histogram data, filtered histogram data, and/or time-of-flight or ranging measurements) from light ranging device 210 to the user and can also allow a user to control LIDAR system 200 with one or more commands. Example commands can include commands that activate or deactivate the LIDAR system; specify photo-detector exposure level, bias, sampling duration and other operational parameters (e.g., emitted pulse patterns and signal processing); specify light emitters parameters such as brightness; and so on. In addition, commands can allow the user to select the method for displaying results. The user interface can display LIDAR system results which can include, e.g., a single frame snapshot image, a constantly updated video image, and/or a display of other light measurements for some or all pixels. In some embodiments, user interface 215 can track distances (proximity) of objects from light-ranging device 210 and potentially provide alerts to a user or provide such tracking information for other purposes. For example, in an automotive driver-assistance application, user interface 215 can provide proximity alerts to a driver, provide tracking information for analytics of driver performance, and so on.

In some embodiments, light ranging device 210 can communicate with a vehicle control unit 217 (or other equipment control unit), and one or more parameters associated with control of a (or other equipment) can be modified based on the received LIDAR data. For example, in a fully autonomous vehicle, the LIDAR system can provide a real time 3D image of the environment surrounding the car to aid in navigation. In other cases, the LIDAR system can be employed as part of an advanced driver-assistance system (ADAS) or as part of a safety system that, e.g., can provide 3D image data to any number of different systems, e.g., adaptive cruise control, automatic parking, driver drowsiness monitoring, blind spot monitoring, collision avoidance systems, etc. However, it should be understood that light ranging device 210 is not limited to automotive applications.

1.3. Example LIDAR Arrays

Figure 3:
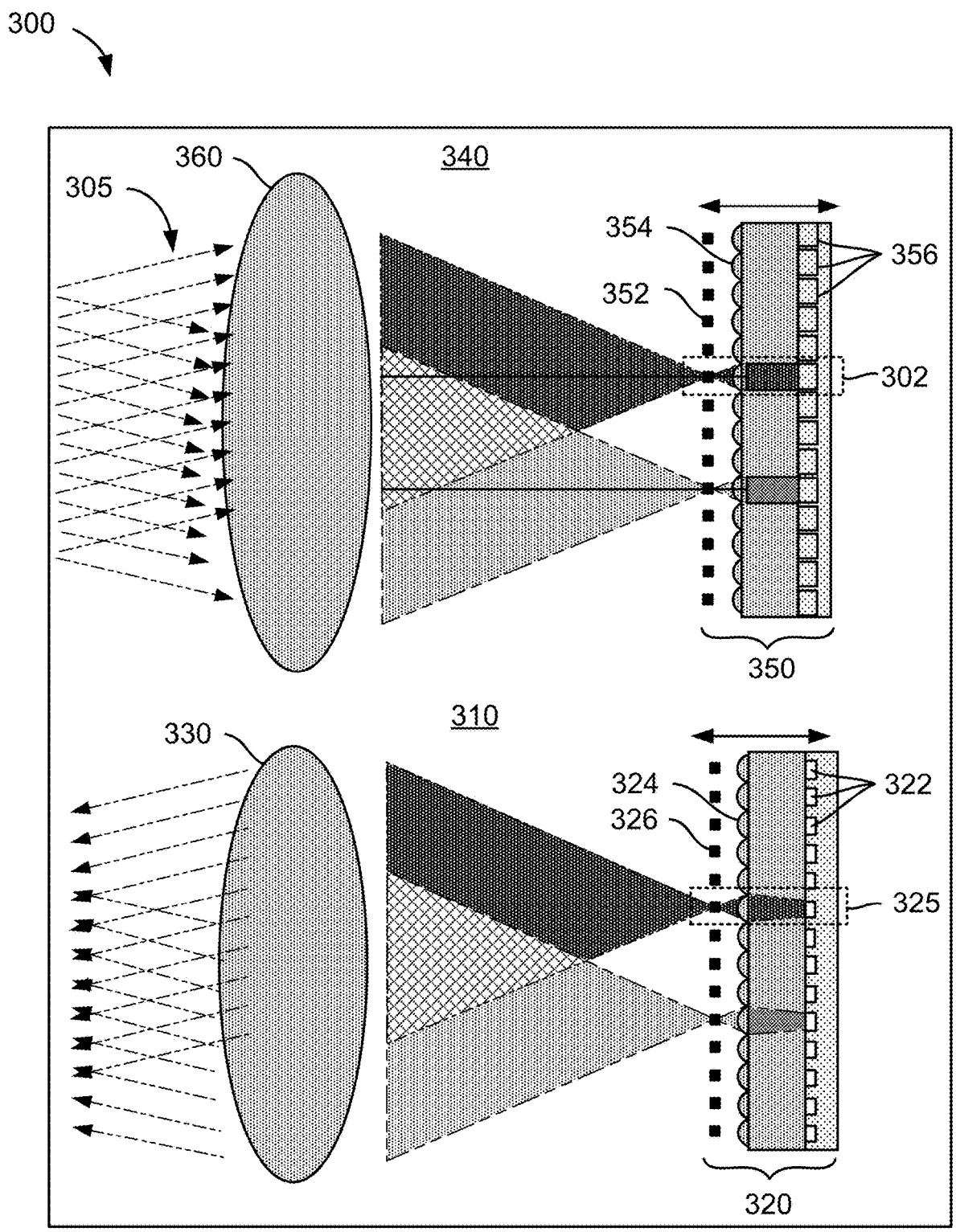
FIG. 3 shows an example of a LIDAR device that can be used in some embodiments.

In some embodiments, emitter array 242 and sensor array 236 can be implemented in a single ASIC or a pair of matched ASICs. FIG. 3 shows a simplified side cross-section view of a LIDAR device 300 that can be used in some embodiments. LIDAR device 300 includes a light transmission (Tx) module 310 and a light sensing (Rx) module 340, which can correspond to light transmission module 240 and light sensing module 230 of FIG. 2. Additional examples of configurations for light transmission module 310 and light sensing module 340 are set forth in U.S. Pat. No. 10,222,475 (entitled "Optical Imaging Transmitter with Brightness Enhancement," issued Mar. 5, 2019, and U.S. Patent Application Pub. No. 2018/0329061 (entitled "Spinning LIDAR Unit with Micro-optics Aligned behind Stationary Window," published Nov. 15, 2018, the disclosures of each of which are incorporated herein by reference in their entirety for all purposes.

As shown in FIG. 3, Tx module 310 can include a Tx-side micro-optics package 320 and a bulk optical element 330. Tx-side micro-optics package 320 (which can implement emitter array 224 and Tx optical system 244 of FIG. 2) includes an array of light emitters 322 and optionally includes a micro-optic lens layer 324 and an aperture layer 326. Emitters 322 can be arranged in a one-dimensional or two-dimensional array of transmitter channels, e.g., channel 325 shown in the boxed region. Each one of the transmitter channels 325 has one or more light emitters 322, e.g., near-infrared (NIR) vertical cavity semiconductor lasers (VCSELs) or the like, capable of emitting narrowband light, and optionally, a micro-lens from lens layer 324 and an aperture from aperture layer 326.

In operation, Tx module 310 provides active illumination of objects in the area around the LIDAR system by, e.g., transmitting pulses of narrow band light, e.g., NIR light having a spectral width of, e.g., 10 nm, 2 nm, 1 nm, 0.5 nm, 0.25 nm or less, into one or more fields of view. Light emitted from each one of emitters 322 diverges as it approaches one of the micro-optics of Tx-side micro-optic lens layer 324. Micro-lenses from micro-optic lens layer 324 capture the diverging light and refocus it to a focal plane that is coincident with apertures in aperture layer 326, which includes an array of apertures that correspond in position to the array of micro-optics and the array of emitters. Aperture array 326 can reduce crosstalk in the system. After exiting the micro-lenses of micro-optic lens layer 324, the focused light again diverges in the form of cones that encounter a Tx-side bulk imaging optics module 330. In some embodiments, the separation between micro-optic lens layer 324 and Tx-side bulk imaging optics module 330 is equal to the sum of their focal lengths, such that light focused at aperture layer 326 appears as collimated light at the output of Tx-side bulk imaging optics module 330 with each collimated bundle of rays exiting Tx-side bulk imaging optics module 330 with a different chief ray angle. Accordingly, the light from each emitter is directed to a different field of view ahead of the device. In some embodiments, Tx-side bulk imaging optic 330 is telecentric on the image side (which is the emitter side) of the lens, i.e., the chief rays on the image side of bulk imaging optic 330 are substantially parallel to each other and normal to the image plane (which is the emitter plane) for every position on the image plane. In this configuration the emitter array can operate as a telecentric source, i.e., the optics capture substantially all light produced by the emitter array, even light that is emitted from the emitters on the outer edges of the array.

Rx module 340 can include an Rx-side micro-optics package 350 and a bulk optic element 360. Rx-side micro-optics package 350 (which can implement sensor array 236 and Rx optical system 237 of FIG. 2) includes an array of photosensors 356 and optionally includes an aperture array 352 and a micro-optic lens layer 354. Photosensors 356 can include electronic devices that detect photons incident on an active area and generate an electrical signal (e.g., a current) in response to incident photons. Photosensors 356 can include, e.g., one or more standard photodiodes, avalanche photodiodes (APDs), single-photon avalanche diodes (SPADs), resonant cavity photodiodes (RCPs), optical nano-antennas, microbolometers, or other suitable photodetectors. In some embodiments, a photosensor 356 may be composed of several photon detector areas (e.g., each a different SPAD) cooperating together to act as a single sensor, often with higher dynamic range, faster response time, or other beneficial properties as compared to a single large photon detection area.

Photosensors 356 can be arranged in a one-dimensional or two-dimensional array of sensor channels, e.g., channel 302 shown in the boxed region. Each sensor channel 302 can include one or more photosensors 356 as and other components, such as a filter (e.g., a narrow-band filter matched to the emission wavelength of emitters 322 to filter out ambient light) and/or structural elements to improve detection efficiency and reduce cross talk with neighboring sensor channels (e.g., diffusers, converging lenses, apertures, optically-non-transparent tube spacer structures, optically-non-transparent conical spacer structures, etc.). Each sensor channel 302 can also have a micro-lens from micro-optic lens layer 356 and an aperture from aperture layer 352. Sensor channels 302 of Rx-side micro-optics package 350 can be arranged to match Tx-side micro-optics package 320, with a sensor channel 302 corresponding to each transmitter channel 325. In some embodiments, the field of view of each individual sensor channel 302 matches the field of view of the corresponding transmitter channel 325.

Rx module 340 can also include an Rx-side bulk imaging optics module 360. In operation, the portions of the emitted light that reflect off of objects in the field, shown as light rays 305, enter Rx-side bulk imaging optics module 360 from multiple directions. Rx-side bulk imaging optics module 360 can include a single lens or a multi-lens group that focuses light rays 305 at a plane that is coincident with Rx-side aperture layer 352, allowing the light to enter sensor channels 302. Rx-side bulk imaging optics module 360 can also collect ambient light. As used herein, "ambient" light refers to any light rays that may be propagating in the environment and that did not originate from Tx module 310. Ambient light can include direct light from any light source that happens to be present in the environment (e.g., the sun, an artificial luminaire, a traffic signal, etc.) as well as light that has been reflected or scattered by an object in the environment (e.g., light reflected off a road sign, a vehicle, a road surface, a tree, etc.). Ambient light can propagate in any direction, and ambient light that happens to be propagating in a similar direction to light rays 305 may enter and pass through Rx-side bulk imaging optics module 360.

1.4. Example Operations

In operation, a LIDAR system (such as any of the example systems described above) can perform ranging operations. An example of ranging operations for a single channel will be described. It should be understood that in a LIDAR array, different channels can operate in a similar manner to perform ranging operations for different pixel areas within a field of view. To the extent that crosstalk is not a concern, different channels can operate simultaneously.

Figure 4:
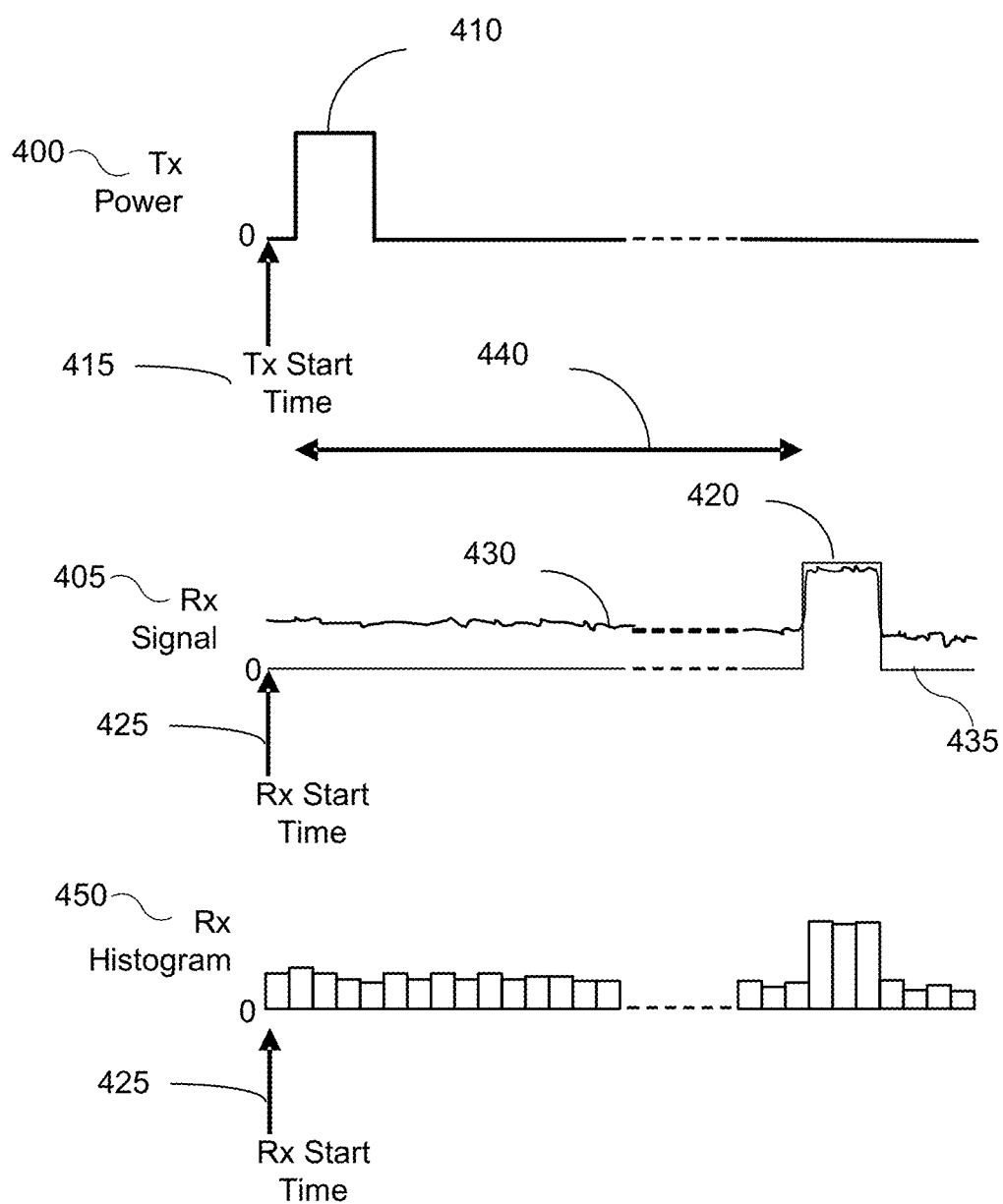
FIG. 4 illustrates the operation of a LIDAR channel in clear-air conditions.

FIG. 4 illustrates the operation of a LIDAR channel in clear-air conditions. The first plot 400 shows power applied to a transmitter (Tx) channel (e.g., emitter channel 325 of FIG. 3) as a function of time (horizontal axis). The second plot 405 shows signal strength (a measurement of received light) at the receiver (Rx) channel (e.g., sensor channel 302 of FIG. 3) as a function of time. In some embodiments, Rx signal strength can be represented as a histogram, e.g., histogram 450. For example, if the receiver channel includes a photosensor that counts photons (such as an array of SPADs), the number of photons counted in each time interval (or time bin) can serve as a measurement of signal strength. As another example, if the receiver channel includes a photosensor that generates an analog electrical signal representing light intensity at a given time, the signal level can be digitized and used to generate histogram 450. It should be understood that histogram 450 can include any number of time bins. While the drawing shows ~20 time bins, in actual practice the number of time bins can be significantly larger (e.g., ~1,000 time bins), and the number of time bins can be chosen according to the intended range and resolution of a particular implementation.

In emitter channel 325, a light source (e.g., a VCSEL or other emitter 322 shown in FIG. 3) generates a light pulse 410 of short duration. An example laser pulse duration, characterized by the full-width half maximum (FWHM), is a few nanoseconds, with the peak power of a single emitter being around a few watts. Embodiments that use side emitter lasers or fiber lasers may have much higher peak powers, while embodiments with small diameter VCSELs may have peak powers in the tens of milliwatts to hundreds of milliwatts.

A Tx start time 415 for the transmission of the pulse does not need to coincide with the leading edge of the pulse. As shown, the leading edge of light pulse 410 can be after the start time 415. Allowing the leading edge to differ from the start time can be useful in situations where different patterns of pulses are transmitted at different times, e.g., for coded pulses as described in above-referenced U.S. Patent Application Pub. No. 2018/0259645.

As shown in second plot 405 and histogram 450, an optical receiver channel (e.g., channel 302 of FIG. 3) can start detecting received light at an Rx start time 425. In some embodiments, Rx start time 425 can be the same as Tx start time 415. In other embodiments, the receiver channel can be operated in a delayed mode in which Rx start time 425 is later than Tx start time 415. As long as the delay between Tx start time 415 and Rx start time 425 is known, time-of-flight determinations can be made. The optical receiver system detects background light 430 initially and after some time detects the laser pulse reflection 420. In some implementations, the optical receiver system can compare the detected light intensity against a threshold to identify the laser pulse reflection 420. The threshold can distinguish the background light from light corresponding to the laser pulse reflection 420. Plot 435 shows the effect of applying a threshold to the received signal in an idealized case with, e.g., no pileup, inefficiency, or atmospheric interference in the photosensor(s) of the Rx channel.

The time-of-flight 440 is the time difference between the pulse being sent and the pulse being received. The time difference can be measured by subtracting the transmission time of the pulse (e.g., as measured relative to Tx start time 415) from a received time of the laser pulse reflection 420 (e.g., also measured relative to Tx start time 415). The distance to the target can be determined as half the product of the time-of-flight and the speed of light.

In some embodiments, a LIDAR system may operate in an accumulative mode in which multiple "shots" are performed, where each shot includes the emitter channel generating a pulse train (one or more light pulses) and the receiver channel collecting histogram data for some time after each pulse train is generated. The receiver channel can accumulate sensor data across multiple shots in a single histogram. The determination of time-of-flight can be based on the accumulated histogram at the end of a measurement interval corresponding to some number (N) of shots. In some embodiments, operating in an accumulated mode can reduce sensitivity to noise or have other benefits.

1.5. Barker Coding

In practical applications, photosensors may be subject to pileup, noise and various inefficiencies, which may affect the determination of time of flight (and therefore distance). For example, SPADs are known to have a recovery time following detection of a photon, during which the SPAD does not respond to additional incoming photons. If each LIDAR channel includes multiple SPADs, this recovery time can result in pileup occurring at the leading edge of the reflected pulse 420. Accordingly, some LIDAR systems may use various coding and filtering techniques (e.g., pulse trains and matched filters) to correct for timing errors that can result from pileup and/or to reduce effects of noise. Examples of suitable filtering techniques are described in above-referenced U.S. Patent Application Pub. No. 2018/0259645. One such technique is referred to as "Barker coding." (The effect is similar to Barker coding used in radar systems, although the process is different.) In a LIDAR system, Barker coding can be implemented by defining two or more pulse-train types. Each pulse train type can have the same pulse duration and pulse spacing (if the train has multiple pulses) but different start times relative to the start time of the shot. Each pulse-train type can be assigned a weight. For instance, if there are two pulse train types, one type can have a positive weight (e.g., +1) while the other has a negative weight (e.g., −1). An accumulated histogram can be computed by multiplying each time bin of a given shot by the weight assigned to the pulse train for that shot and adding the results. Since some of the weights are negative, some or all bins of the accumulated histogram may have negative values. At the end of a measurement interval (which includes an equal number of shots using each type of pulse train), a matched filter can be applied to the accumulated histogram to generate a filtered histogram that can be used for time-of-flight determination.

Figure 5B:
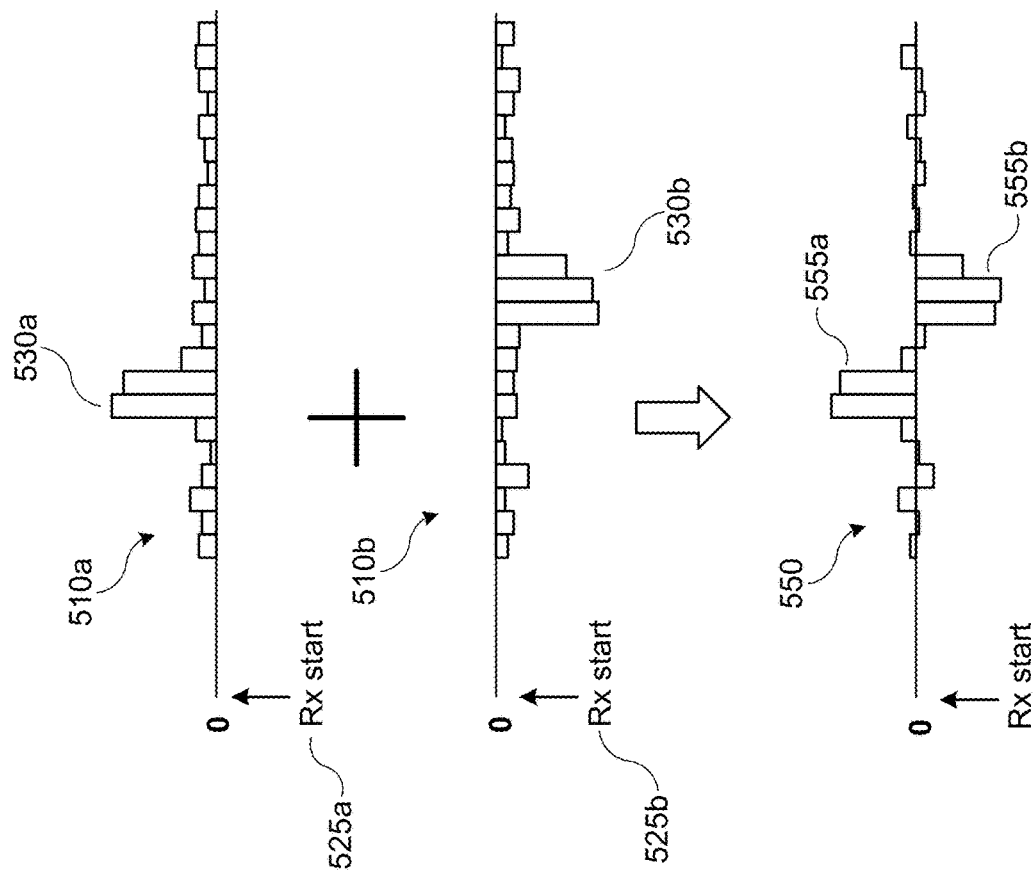
Figure 5C:
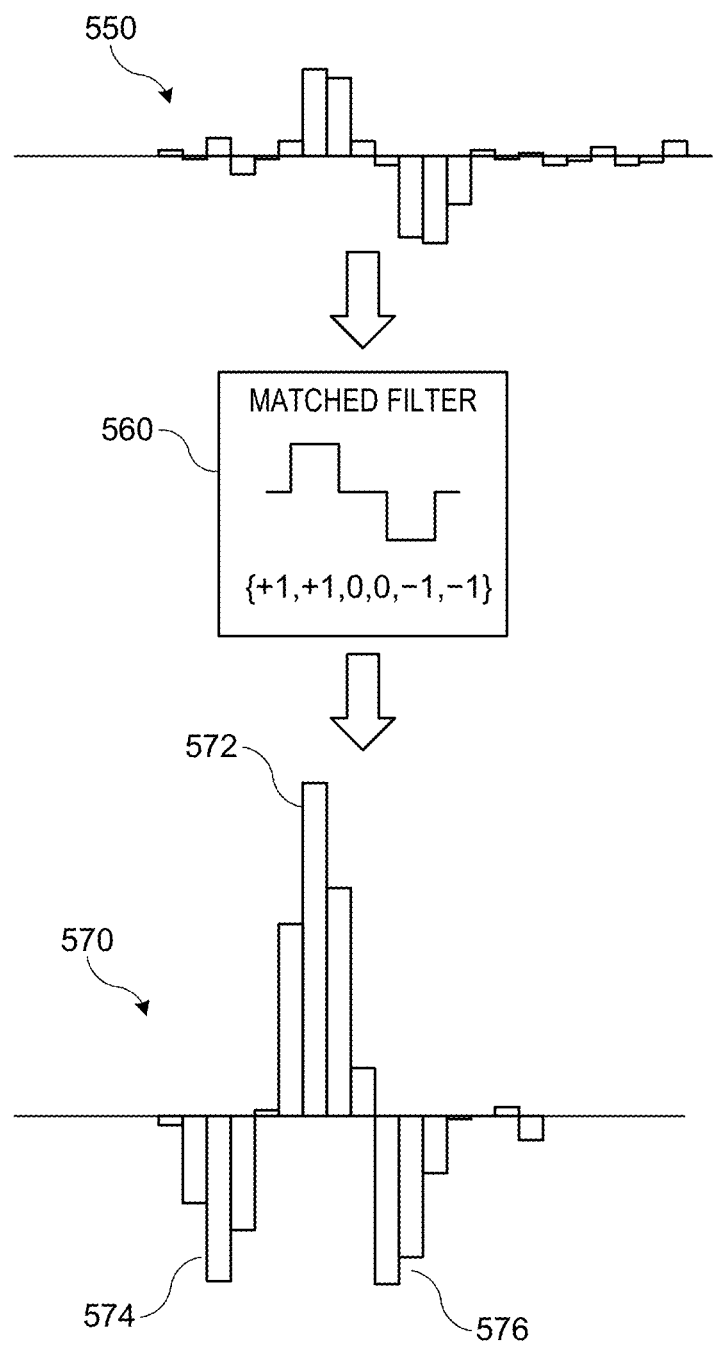

By way of illustration, FIGS. 5A-5C show a simplified example of Barker coding for a LIDAR system according to some embodiments. Referring first to FIG. 5A, curve 500a shows emitter power as a function of time for a first (positive-weighted) shot, similarly to FIG. 4. In this example, the first shot includes an emitter pulse train consisting of one pulse having duration 6; however, more than one pulse per shot can be used if desired. For the first shot, the start time of pulse 505a is delayed relative to Tx start time 515a and Rx start time 525a by an offset $\tau_a$, which can be zero or a few nanoseconds (e.g., 4, 8, 12, or 16 ns or the like). Curve 500b shows emitter power as a function of time for a second (negative-weighted) shot. For the second shot, the start time of pulse 505b is delayed relative to Tx start time 515b (and Rx start time 525b) by an offset $(\tau_b)$ that is different from offset $\tau_a$ used for the first shot. In the example shown, $\tau_a$ and $\tau_b$ are chosen such that $\tau_b = \tau_a + 2\delta$, but other choices can also be made. For instance $\tau_b - \tau_a$ can be 4 ns, 8 ns, 16 ns, etc.

Histogram 510a shows receiver signal intensity in a set of consecutive time bins for the first shot. (As with other examples, it should be understood that a histogram may include a much larger number of bins than the number shown in the drawings.) In this example, and a peak 530a is observed in histogram 510a. Similarly, histogram 510b shows receiver signal intensity in a set of consecutive time bins for the second shot. A peak 530b is visible. Assuming that peaks 530a and 530b are due to reflection from an object in the environment and the object does not change position significantly between the two shots, peak 530a represents the same time of flight as peak 530b.

FIG. 5B shows an example of accumulating histograms 510a and 510b using Barker coding. A +1 weight is assigned to histogram 510a, and a −1 weight is assigned to histogram 510b (shown by the bars of histogram 510b extending below the "0" line). Histograms 510a and 510b are aligned such that Rx start times 525a and 525b coincide, so that corresponding bins represent the same time relative to the Rx start time. It should be noted that the peak-intensity bin 530a of histogram 510a is offset from the peak-intensity bin 530b of histogram 510b, due to the different timing of pulses 505a and 505b for the two shots. Accumulated histogram 550 is obtained by adding each bin of histogram 510b to the corresponding bin of histogram 510a. While accumulation is shown for two shots, it should be understood that any (even) number of shots can be accumulated, with half the shots using a first pulse pattern and having a positive weight and the other half of the shots using a second pulse pattern (temporally offset from the first) and having a negative weight.

As shown in FIG. 5B, accumulated histogram 550 has a positive peak 555a and a negative peak 555b. To extract time-of-flight information, a matched filter can be applied to accumulated histogram 550, as shown in FIG. 5C. As described in above-referenced U.S. Patent Application Pub. No. 2018/0259645, a matched filter can have a number of taps with each tap having an assigned filter weight based on the pulse pattern. In the case of accumulated histogram 550, the relevant pulse pattern is a combination of pulse 505a with a +1 weight and pulse 505b with a −1 weight. Thus, in this example, matched filter 560 has taps {+1, +1, 0, 0, −1, −1}. Matched filter 560 can be applied to accumulated histogram 550 using a sliding window technique, yielding filtered histogram 570. Filtered histogram 570 has a central peak 572 (which can be the basis for determining time-of-flight) and negative side lobes 574, 576 (which are characteristic of Barker coding).

It should be understood that FIGS. 5A-5C provide a simplified illustration of an operating principle of Barker coding and that variations are possible. Any number of shots can be accumulated, with some shots having positive accumulation weight while other shots have negative accumulation weight. A time offset between pulse trains assigned different weights can be introduced, e.g., by delaying the rise time of the pulse train by different amounts relative to receiver start time or by delaying receiver start time by different amounts relative to transmitter start time. The time offsets can be selected so that peak emitter intensity is offset between differently-weighted shots by at least one time bin. Barker coding can also be combined with other signal processing techniques as desired.

2. Fog Compensation

"Fog" as used herein refers generally to droplets of water vapor (or other similar droplets) that hang in the air. It is known that the droplets that constitute fog can scatter light at wavelengths commonly used for LIDAR (e.g., NIR wavelengths). This scattering can result in photons from a LIDAR emitter pulse arriving across a range of times, which can result in inaccurate time-of-flight (or ranging) measurements.

2.1. Effects of Fog

Figure 6:
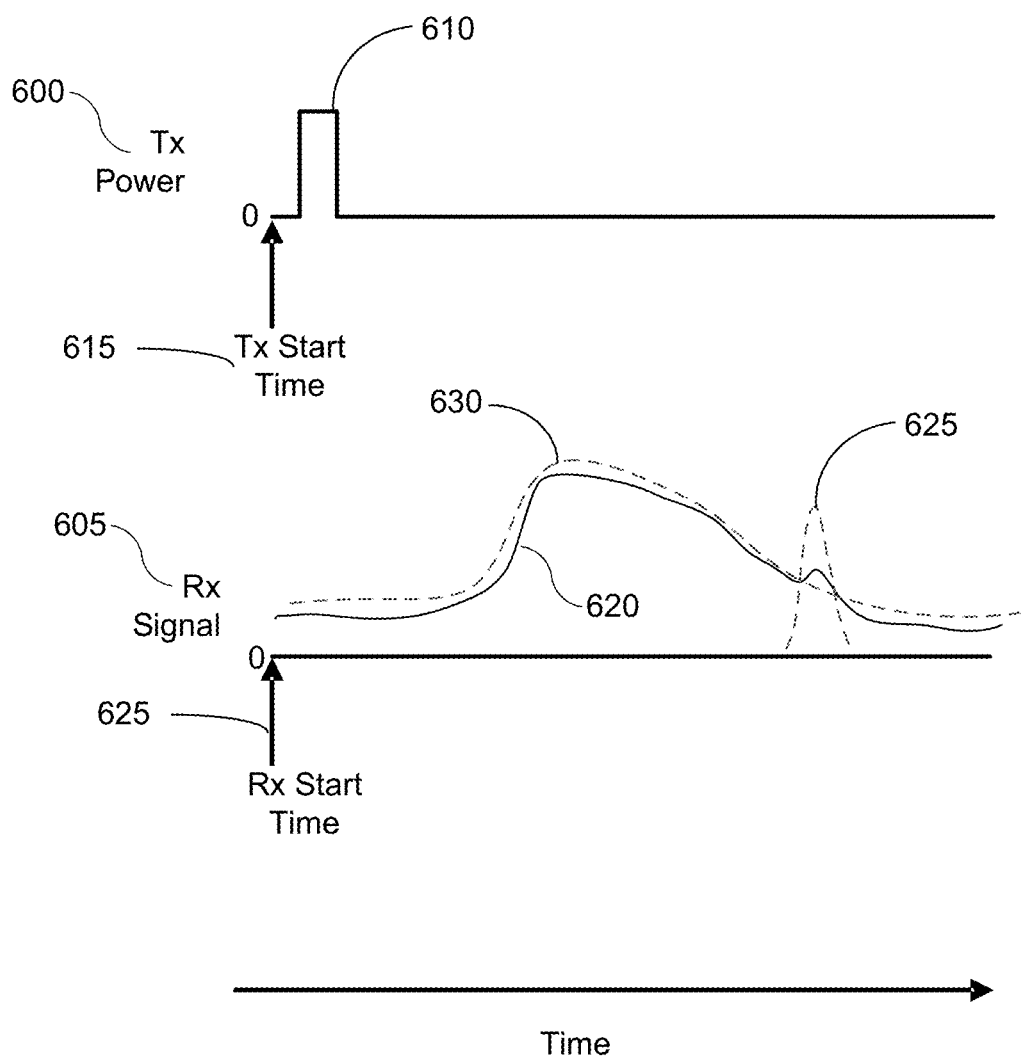
FIG. 6 shows an example of operation of a conventional LIDAR channel in the presence of fog

FIG. 6 shows an example of operation of a conventional LIDAR channel in the presence of fog. FIG. 6 is similar to FIG. 4, except for the effect of fog. The upper plot 600 shows power applied to the transmitter (Tx) channel (e.g., emitter channel 325 of FIG. 3) as a function of time. The lower plot 605 shows signal strength (a measurement of received light) at the receiver (Rx) channel (e.g., sensor channel 302 of FIG. 3) as a function of time. As shown in plot 600, in emitter channel 325, a light source (e.g., a VCSEL or other emitter 322 shown in FIG. 3) generates a light pulse 610 of short duration, similarly to light pulse 410 of FIG. 4, after a Tx start time 615. As shown in plot 605, an optical receiver channel (e.g., sensor channel 302) can start detecting received light at Rx start time 625, which can be the same as Tx start time 615 or a different start time as desired. Some of the emitted photons scatter off the fog and may be reflected or scattered toward one or more sensor channels 302 at various times while other photons reach a solid surface in the field of view and are reflected from that surface. Consequently, Rx signal 620 can be understood as including a contribution 625 due to reflection of emitter pulse 610 and a contribution 630 due to scattering by the fog. In this example, most of the photons in the emitter pulse are scattered by fog. Thus, as shown, fog can make it difficult for a LIDAR system to accurately determine time of flight.

2.2. Fog Compensation

According to various embodiments, a LIDAR system can compensate for the presence of fog by modifying its behavior. In some embodiments, Barker coding can be used to compensate for the presence of fog. Receiver response in the presence of fog (e.g., Rx signal 620 of FIG. 6) can be understood as a superposition of a low-frequency signal component 630 due to fog-induced scattering and a high-frequency signal component 625 due to a reflective (solid) surface in the field of view. Barker coding can act as a high-pass filter, removing or reducing the low-frequency component so that the high-frequency component becomes relatively stronger.

Accordingly, some embodiments employ Barker coding to enable a more reliable signal to be extracted from histogram data in the presence of fog. Any Barker coding scheme with an equal number of positive-weighted and negative-weighted shots can be used.

Figure 7:
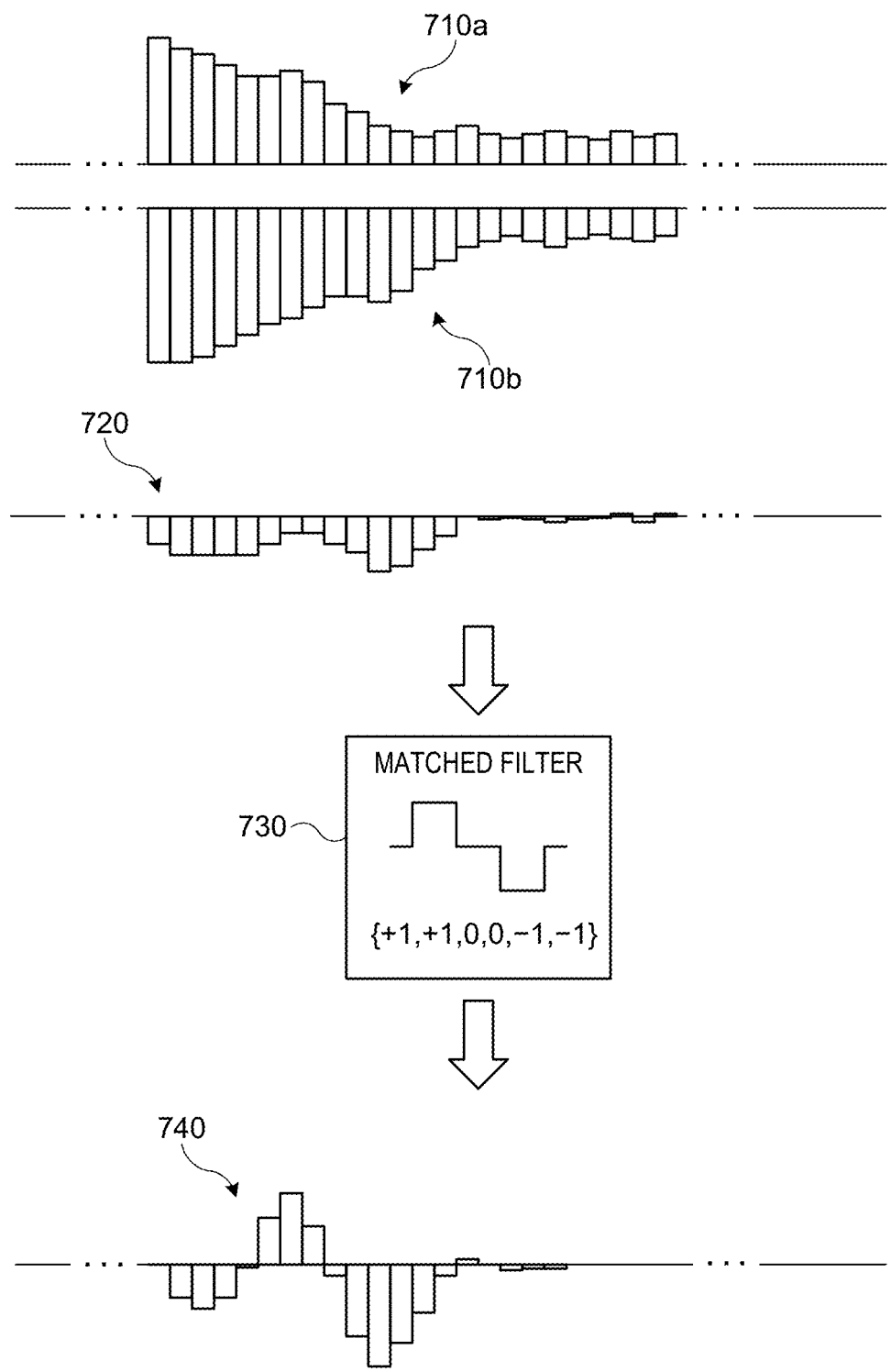
FIG. 7 shows an example of fog compensation using Barker coding according to some embodiments.

FIG. 7 shows an example of fog compensation using Barker coding according to some embodiments. The pulse trains in this example are the same as pulse trains 500a, 500b described above with reference to FIG. 5A. Histogram 710a shows a portion of raw histogram that may be obtained from a receiver channel in the presence of fog for a positive-weighted shot. (As with other examples, the number of bins shown is small for purposes of illustration, and it should be understood that a histogram may have a much larger number of bins.) Histogram 710a includes a low-frequency component (indicated by curve 712) corresponding to fog-induced scattering and a high-frequency component (indicated by curve 714) corresponding to reflected light from a solid object. Histogram 710b shows a corresponding portion of a raw histogram that may be obtained from the same receiver channel for a negative-weighted shot. As with histogram 710a, both fog-induced scattering and reflection from a solid object contribute to the receiver signal. Accumulated histogram 720 can be obtained by adding histograms 710a and 710b, similarly to accumulated histogram 650 of FIG. 6B. Matched filter 730 (which in this example is the same as matched filter 560 of FIG. 5C) can be applied to accumulated histogram 720 to produce filtered histogram 740, from which time-of-flight data can be extracted.

It should be understood that the effect of Barker coding shown in FIG. 7 is illustrative. An accumulated histogram can be created over a measurement interval that includes any number of shots. In some embodiments, two pulse-train types are used, with half the shots in the measurement interval being of the first type (which is positive-weighted) and the other half being of the second type (which is negative-weighted). The particular order in which different shots are performed is not critical. In addition, the pulse train can be varied and is not limited to a single pulse per pulse train. Barker coding can also be combined with other signal-processing techniques as desired.

3. Fog Detection and Adaptive Response

In some embodiments, Barker coding or other techniques for enhancing a LIDAR signal in the presence of fog can be selectively applied when fog is present and not applied when fog is not present. For instance, a LIDAR system such as any of the systems described above can analyze raw histogram data to detect the presence of atmospheric fog and can switch to a "fog mode" of operation when fog is detected or to a "clear-air mode" (or "non-fog mode") of operation when fog is not detected. The fog mode can include Barker coding as described above and/or other operations.

3.1. Detecting Fog

In some embodiments, the presence of fog can be detected by analyzing the raw histogram data from one or more of the sensor channels. As described above, raw histogram data may be smeared out due to fog-induced scattering (e.g., as shown in raw histogram 710 of FIG. 7). Various analysis techniques can be used to determine whether a raw histogram indicates fog or not.

One approach to determining whether a raw histogram indicates fog or not can be based on signal-shape analysis. For example, as shown in FIG. 6, fog introduces a low-frequency component 630 due to scattering of light. The particular shape of component 630 may vary depending, e.g., on the density of fog. In some embodiments, a signal-shape classifier can be trained to recognize the presence of component 630 in raw (and unweighted) histogram data. One example of a signal-shape classifier is a curve-fitting algorithm that attempts to fit the raw histogram data to a curve characteristic of fog, which can be defined in a parameterized form. Using standard statistical techniques, a goodness-of-fit parameter can be computed, and the presence or absence of fog can be determined based on the goodness-of-fit parameter. As another example, a curve-shape classifier can be trained, e.g., using machine-learning techniques, to distinguish between presence and absence of fog, and the trained classifier can be applied to raw histogram data to determine whether fog is present. The raw histogram data can be single-shot data or data accumulated across multiple shots (with the same weight applied to each shot).

Another approach can be based on the total background flux received by the receiver channel. Fog can increase the total amount of light detected by the receiver channel, in part because ambient light is also scattered by the fog, increasing the total amount of incident light. Thus, determining the total background flux (e.g., summing up all histogram bins that are below a threshold for identifying a signal) and comparing to a minimum value can be used to indicate fog.

It is noted that localized areas of high water-vapor concentration may occur for reasons other than generally foggy atmospheric conditions. For instance, localized clouds of steam may be produced by vehicle tailpipes, ventilation systems (e.g., for underground utility lines or subway systems), and so on. In some embodiments, localized water vapor can be distinguished from atmospheric fog (i.e., generally foggy atmospheric conditions) by considering sensor data across a wider field of view rather than from a single receiver channel. For instance, an average background flux per channel can be computed across all sensor channels and used to assess whether atmospheric fog is present. As another example, where signal-shape analysis is applied to individual sensor channels, a final determination of the presence or absence of atmospheric fog can be based on overall results, e.g., if at least a minimum number or fraction of sensor channels have a signal shape indicative of fog, then atmospheric fog is determined to be present. The minimum fraction can be, e.g., all of the channels, 75% of the channels, 50% of the channels, or some other fraction.

The fog detection techniques described herein are illustrative, and other techniques may be used.

3.2. Adaptive Fog Response

Figure 8:
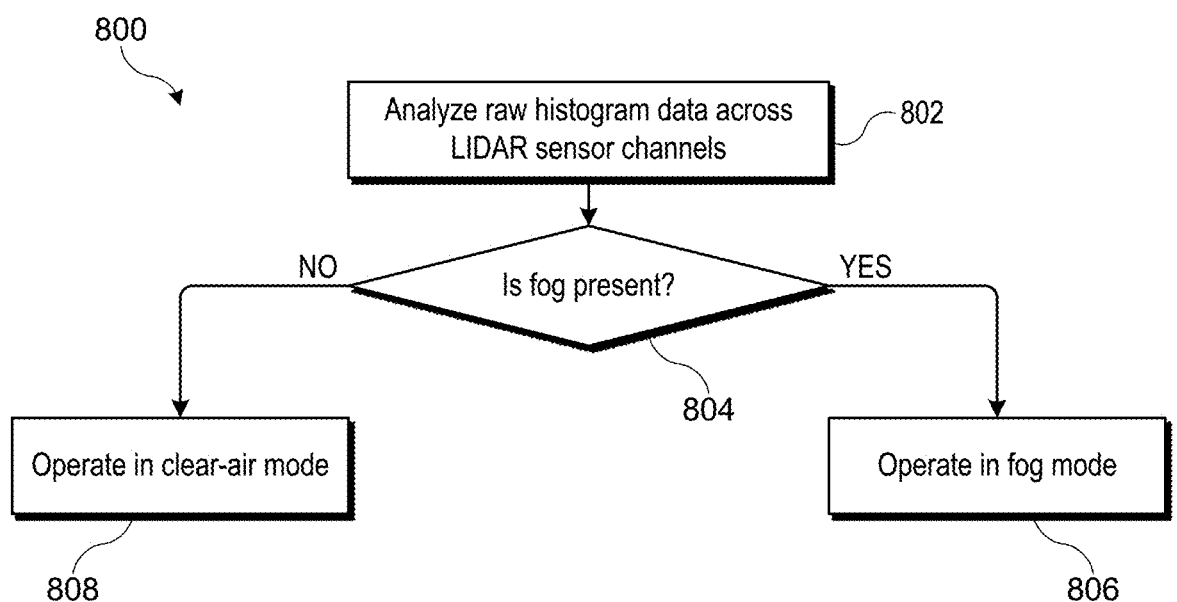
FIG. 8 is a flow diagram of a process for operating a LIDAR system according to some embodiments.

According to some embodiments, a LIDAR system can automatically detect fog and adapt its operations accordingly. FIG. 8 is a flow diagram of a process 800 for operating a LIDAR system according to some embodiments. Process 800 can be implemented in LIDAR system 200 or any other LIDAR system described herein, or in other LIDAR systems that operate on similar principles.

Process 800 can begin by determining whether fog is present. For instance, at block 802, process 800 can analyze raw histogram data across LIDAR sensor channels to determine the presence or absence of fog. Any of the analysis techniques described in section 3.1 above can be applied, and other techniques may also be substituted.

At block 804, process 800 determines whether fog is present, based on the analysis at block 802. The criteria for determining whether fog is present depend on the type of analysis performed at block 802. Examples are described in section 3.1 above. In some embodiments, fog can be defined as atmospheric fog that affects most or all of the LIDAR sensor channels.

If fog is present, then at block 806, process 800 can operate the LIDAR system in a fog mode; if fog is not present, then at block 808, process 800 can operate the LIDAR system in a clear-air (or non-fog) mode. The fog mode and clear-air mode can differ from each other in various respects.

For example, as described above, Barker coding can be helpful in extracting a return signal from a solid object in the presence of fog. However, it may not be desirable to apply Barker coding in all situations. Accordingly, in some embodiments Barker coding may be enabled in fog mode and disabled in clear-air mode; thus, the modes can differ in whether Baker coding is used. As another example, optimal Barker coding parameters may be different between clear-air and fog. For instance, the number of pulse-train types, pulse pattern for each pulse-train type, and so on may be different. Accordingly, in some embodiments, operating the LIDAR system in fog mode can include applying a first set of Barker coding parameters while operating the LIDAR system in clear-air mode includes applying a second set of Barker coding parameters that is different from the first.

Other examples of differences that can be implemented between fog mode and clear-air mode include emitter intensity, pulse duration, pulse pattern, accumulation weights for different shots, sensor gain parameters, and so on.

4. Additional Embodiments

While the invention has been described with reference to specific embodiments, those skilled in the art with access to the present disclosure will appreciate that numerous variations and modifications are possible. LIDAR arrays of the kind described herein can be fabricated to include any number of emitter and sensor channels. In some embodiments, the channels can be arranged in one or more columns that may scan a field of view in a row-wise direction transverse to the column direction. (The terms "row" and "column" are used to distinguish two dimensions of a sensor array, particularly in the context of arrays used in scanning mode, and are not intended to imply any particular spatial orientation of the array.) The particular construction of sensor channels. LIDAR sensor channels can operate at various wavelengths, including near infrared, shortwave infrared (e.g., 1600 nm), midwave infrared, and/or longwave infrared (e.g., up to 15 μm). In some embodiments, a sensor array may also incorporate one or more ambient-light sensor channels (i.e., sensor channels that measure light intensity, as opposed to time-of-flight or other ranging data) in addition to the LIDAR sensor channels, and one or more ambient-light sensor channels can be arranged in a row with one or more LIDAR sensor channels, between LIDAR sensor channels, or elsewhere as desired. LIDAR systems can be implemented using rotating and/or static platforms as described above and can be used in any application where it is desirable to collect ranging data.

Systems described herein can produce depth (or ranging) information across a field of view (which can be as wide as desired, up to 360 degrees in some embodiments). In some embodiments, the depth information can be used to generate images for display to a user, which can include directly rendering the image data and/or rendering an image of a scene (or portions thereof) based on algorithmic inferences from the data. Depth information can be used in various applications, such as proximity monitoring and alerting, 3D mapping (e.g., terrain mapping), and so on. While some examples described above relate to vehicle navigation and/or driver assistance, the invention is not limited to any particular data analysis or to any particular application of ranging data.

The above description is illustrative and is not restrictive. The described embodiments were chosen in order to illustrate various principles of the invention and its practical applications, and many variations and modifications of the invention will become apparent to those skilled in the art upon review of the disclosure. The scope of patent protection should, therefore, be determined not with reference to the above description, but instead should be determined with reference to the following claims along with their full scope or equivalents.

What is claimed is:

1. A method of operating a LIDAR system, the method comprising:
    determining, based on photosensor data from a plurality of sensor channels of the LIDAR system, whether atmospheric fog is present in a field of view of the LIDAR system;
    in response to determining that atmospheric fog is present, operating the LIDAR system in a fog mode; and
    in response to determining that atmospheric fog is not present, operating the LIDAR system in a clear-air mode,
    wherein operating the LIDAR system in the fog mode includes operating a plurality of emitter channels to generate a pulse train having a first pulse pattern and operating the LIDAR system in the clear-air mode includes operating the plurality of emitter channels to generate a pulse train having second pulse pattern different from the first pulse pattern.

2. The method of claim 1 wherein operating the LIDAR system in the fog mode includes applying a Barker coding procedure and operating the LIDAR system in the clear-air mode includes not applying the Barker coding procedure.

3. The method of claim 2 wherein applying the Barker coding procedure includes:
    operating an emitter channel of the LIDAR system to generate a pulse train for each of a plurality of shots, wherein the pulse trains for different shots in the plurality of shots are of at least two different pulse-train types; and
    generating an accumulated histogram of detected light intensity across the plurality of shots wherein shots having a first one of the pulse-train types are accumulated with a positive weight and shots having a second one of the pulse-train types are accumulated with a negative weight.

4. The method of claim 3 wherein applying the Barker coding procedure further includes:
    applying a matched filter to the accumulated histogram, wherein the matched filter is defined based on combining the pulse-train types.

5. The method of claim 3 wherein the number of shots in the plurality of shots is two.

6. The method of claim 1 wherein:
    operating the LIDAR system in the fog mode includes operating an emitter of the LIDAR system to generate a pulse train having a single pulse; and
    operating the LIDAR system in the clear-air mode includes operating the emitter to generate a pulse train having a plurality of pulses.

7. The method of claim 1 wherein determining whether atmospheric fog is present includes:
    analyzing raw histogram data from the plurality of sensor channels of the LIDAR system; and
    determining whether the raw histogram data from each of at least a minimum number of the sensor channels has a signal shape characteristic of fog.

8. The method of claim 7 wherein the minimum number of sensor channels is equal to a total number of sensor channels in the LIDAR system.

9. The method of claim 7 wherein the minimum number of sensor channels is more than half of a total number of sensor channels in the LIDAR system and less than the total number of sensor channels in the LIDAR system.

10. The method of claim 1 wherein determining whether atmospheric fog is present includes:
    determining a total background flux across a plurality of sensor channels;
    determining that atmospheric fog is present in the event that the total background flux exceeds a threshold; and
    determining that atmospheric fog is not present in the event that the total background flux does not exceed the threshold.

11. A LIDAR system comprising:
    an array of emitter channels;
    an array of sensor channels;
    a signal processing circuit coupled to the array of sensor channels and configured to determine, based on photosensor data from the array of sensor channels, whether atmospheric fog is present in a field of view; and
    a control circuit coupled to the signal processing circuit, the array of emitter channels and the array of sensor channels, the control circuit being configured to:
        operate the array of emitter channels and the array of sensor channels in a fog mode in response to determining that atmospheric fog is present; and
        operate the array of emitter channels and the array of sensor channels in a clear-air mode in response to determining that atmospheric fog is not present,
        wherein operating the LIDAR system in the fog mode includes operating a plurality of emitter channels to generate a pulse train having a first pulse pattern and operating the LIDAR system in the clear-air mode includes operating the plurality of emitter channels to generate a pulse train having second pulse pattern different from the first pulse pattern.

12. The LIDAR system of claim 11 wherein the control circuit is further configured such that operating the array of emitter channels and the array of sensor channels in the fog mode includes applying a Barker coding procedure and operating the array of emitter channels and the array of sensor channels in the clear-air mode includes not applying the Barker coding procedure.

13. The LIDAR system of claim 12 wherein the control circuit is further configured such that applying the Barker coding procedure includes:
   operating an emitter channel of the array of emitter channels to generate a pulse train for each of a plurality of shots, wherein the pulse trains for different shots in the plurality of shots are of at least two different pulse-train types; and
   generating an accumulated histogram of detected light intensity across the plurality of shots wherein shots having a first one of the pulse-train types are accumulated with a positive weight and shots having a second one of the pulse-train types are accumulated with a negative weight.

14. The LIDAR system of claim 13 wherein the control circuit is further configured such that applying the Barker coding procedure further includes:
   applying a matched filter to the accumulated histogram, wherein the matched filter is defined based on combining the pulse-train types.

15. The LIDAR system of claim 13 wherein the number of shots in the plurality of shots is two.

16. The LIDAR system of claim 11 wherein the control circuit is further configured such that:
   operating the array of emitter channels and the array of sensor channels in the fog mode includes operating an emitter of the LIDAR system to generate a pulse train having a single pulse; and
   operating the array of emitter channels and the array of sensor channels in the clear-air mode includes operating the emitter to generate a pulse train having a plurality of pulses.

17. The LIDAR system of claim 11 wherein the control circuit is further configured such that determining whether atmospheric fog is present includes:
   analyzing raw histogram data from the array of sensor channels; and
   determining whether the raw histogram data from each of at least a minimum number of the sensor channels has a signal shape characteristic of fog.

18. The LIDAR system of claim 17 wherein the minimum number of sensor channels is equal to a total number of sensor channels in the LIDAR system.

19. The LIDAR system of claim 17 wherein the minimum number of sensor channels is more than half of a total number of sensor channels in the LIDAR system and less than the total number of sensor channels in the LIDAR system.

20. The LIDAR system of claim 11 wherein the control circuit is further configured such that determining whether atmospheric fog is present includes:
   determining a total background flux across a plurality of sensor channels in the array of sensor channels;
   determining that atmospheric fog is present in the event that the total background flux exceeds a threshold; and
   determining that atmospheric fog is not present in the event that the total background flux does not exceed the threshold.

* * * * *